United States Patent [19]

Van De Pas

[11] Patent Number: 4,927,228

[45] Date of Patent: May 22, 1990

[54] OPTOELECTRONIC ARRANGEMENT HAVING A COUPLING BETWEEN AN OPTICAL TRANSMISSION FIBRE AND A SEMICONDUCTOR LASER DIODE

[75] Inventor: Hermanus A. Van De Pas, Nijmegen, Netherlands

[73] Assignee: U.S. Philips Corp., New York, N.Y.

[21] Appl. No.: 359,464

[22] Filed: May 31, 1989

[30] Foreign Application Priority Data

Jun. 6, 1988 [NL] Netherlands .......................... 8801443

[51] Int. Cl.[5] .................................................. G02B 6/36
[52] U.S. Cl. .................................................. 350/96.20
[58] Field of Search ................ 350/96.15, 96.20, 96.21

[56] References Cited
U.S. PATENT DOCUMENTS

| | | | |
|---|---|---|---|
| 4,186,996 | 2/1980 | Bowen et al. | 350/96.20 |
| 4,355,323 | 10/1982 | Kock | 357/74 |
| 4,752,109 | 6/1988 | Gordon et al. | 350/96.20 |
| 4,790,618 | 12/1988 | Abe | 350/96.20 |

*Primary Examiner*—William L. Sikes
*Assistant Examiner*—Akm E. Ullah
*Attorney, Agent, or Firm*—William L. Botjer

[57] ABSTRACT

An optoelectronic arrangement having a coupling between an optical transmission fibre and a semiconductor laser diode and with a holder for the optical transmission fibre, while an intermediate part is arranged between the two holders, the intermediate part and one of the two holders being arranged so that they can be slipped one into the other and one of these parts having an annular connection part of reduced thickness, which after axial adjustment of the end of the optical transmission fibre with respect to the semiconductor laser diode is secured to the surface of the other part by means of a number of laser welds, while the intermediate part and the other holder have a flat surface which is at right angles to the direction of axial adjustment, which surfaces engage each other, one of these surfaces having a flange of reduced thickness which after transversal adjustment of the end of the transmission fibre with respect to the laser element is secured to the other surface by a number of laser welds.

4 Claims, 2 Drawing Sheets

OPTOELECTRONIC ARRANGEMENT HAVING A COUPLING BETWEEN AN OPTICAL TRANSMISSION FIBRE AND A SEMICONDUCTOR LASER DIODE

BACKGROUND OF THE INVENTION

The invention relates to an optoelectronic arrangement having a coupling between an optical transmission fibre and a semiconductor laser diode, this arrangement being provided with a holder for the semiconductor laser diode and with a holder for the optical transmission fibre, one end of said fibre facing the semiconductor laser diode.

In such an arrangement, it is of major importance that the end of the optical transmission fibre and the semiconductor laser diode are aligned very accurately with respect to each other in order to achieve that a high coupling efficiency is obtained.

A number of ways are known to couple the optical transmission fibre and the semiconductor laser diode to each other. This coupling must be accurate, must not deviate due to external influences, must have a simple construction and must offer the possibility of establishing a vacuum-tight seal. The known arrangements do not satisfy this combination of requirements.

SUMMARY OF THE INVENTION

The invention is based on the recognition of the fact that the alignment of the transmission fibre with respect to the semiconductor laser diode and the fixation in the aligned state directly influence each other mutually and that also may vacuum-tight sealing may have effect on the accuracy.

The invention has for its object to provide an optoelectronic arrangement of the kind mentioned in the opening paragraph, in which the alignment of the transmission fibre and the laser diode can be effected in an accurate and simple manner, while the subsequent fixation does not adversely affect the alignment accuracy, and an arrangement of simple construction can be used and, if desired, a vacuum-tight seal may be obtained without the adjustment accuracy being varied. In order to achieve this object, according to the invention, an intermediate part is provided between the holder for the semiconductor laser diode and the holder for the optical transmission fibre, the intermediate part and one of the two holders being arranged so that they can be slipped one into the other and one of these parts having an annular connection part of reduced thickness, while after axial adjustment of the end of the transmission fibre with respect to the semiconductor laser diode the connection part of reduced thickness of one part is secured to the surface of the other part by means of a number of laser welds, the facing ends of the intermediate part and the other holder having a flat surface which is at right angles to the direction of axial adjustment, which surfaces engage each other, one of these surfaces having a flange of reduced thickness, while after transversal adjustment of the end of the transmission fibre with respect to the laser element this flange of reduced thickness is secured by a number of laser welds to the other surface.

The form according to the invention with the intermediate part between the two holders is of simple construction. The independent axial and transversal adjustments permit of very accurately adjusting the fibre end with respect to the laser diode. The step of fixing, in which a connection part of reduced thickness and a flange of reduced thickness are used, and the use of laser welds result in a firm fixation, which hardly exerts any thermal and mechanical forces and hence does not cause the accurate adjustment to be varied. A coupling with an optimum coupling efficiency is obtained between the laser diode and the transmission fibre. The adjustment accuracy is so high that not only multimode fibres, but also monomode transmission fibres can be used. The fixation is so stable that, after the laser welds have been provided, the parts can be sealed in a vacuum-tight manner, which does not adversely affect the adjustment accuracy.

The invention can be realized in different ways, as appears from a few embodiments to be described. It is then favourable to choose for the connection part of reduced thickness and for the thin flange a value of the thickness of less than 0.4 mm and preferably a value of the thickness of about 0.2 mm, while the laser welds are provided symmetrically, preferably three laser welds which are each time located at an angle of 120° at the circumference of a circle.

BRIEF DESCRIPTION OF THE DRAWINGS

The invention will be described more fully with reference to two embodiments shown in the drawing.

DETAILED DESCRIPTION OF THE PREFERRED EMBODIMENT

The invention idea, according to which three mutually adjustable parts are used, i.e. a holder for the semiconductor laser diode, a holder for the optical transmission fibre and an intermediate part, can be obtained in different embodiments, two of which will be described.

In all embodiments, the different parts are secured by means of laser welding of an intermediate part of reduced thickness and laser welding of a thin flange.

Figure 1:
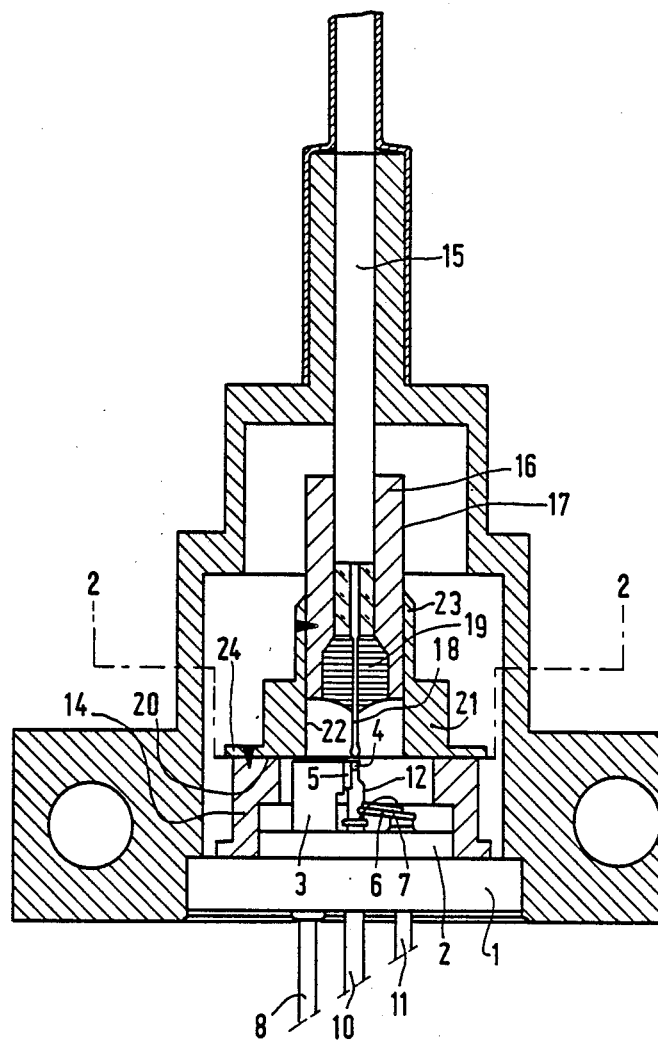
FIG. 1 is a longitudinal sectional view of a first embodiment of the optoelectronic arrangement.
Figure 2:
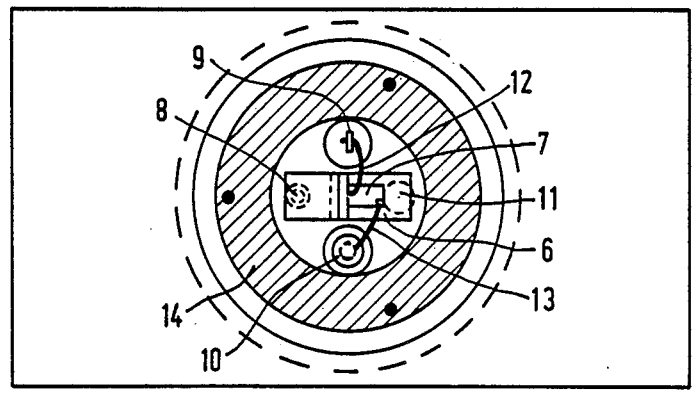
FIG. 2 is a cross-section taken on the line 2—2 in FIG. 1.

FIG. 1 shows a first embodiment of an arrangement for optically coupling a semiconductor laser diode to an optical transmission fibre. The transmission fibre may be a multimode fibre, but also a monomode fibre may accurately be coupled by means of the arrangement according to the invention.

The housing for the laser element comprises a metal base 1 having an embossed part 2. A metal column 3 is present on the part 2. The laser element 4 is secured, for example, on a support 5 of silicon, which is secured to the column 3. A further support part 6 is arranged on the embossed part 2 and a photodiode 7 is secured on this support part. By means of the photodiode 7, the emitted quantity of light of the laser diode 4 is measured, which is directed towards the base 1. The intensity of the emission of the laser diode 4 can be controlled by means of the signal then produced in the photodiode.

For the electrical connections a number of pins 8, 9, 10 and 11 are present. The pin 8 is an earth pin and is connected to the metal base 1. The pins 9, 10 and 11 are passed through the base 1 in an isolating manner. A connection of the laser diode 4 is constituted by the pin 8, the column 3 and the support 5. The other electrical connection consists of a connection wire 12 from the laser diode to the pin 9. The control diode 7 is connected through the support 6 to the pin 11; the support 6 is then secured on the pin 11. The control diode 7 is further in connection with the pin 10 by means of a wire 13. A housing part in the form of an annular sheath 14 is arranged on the base and the upper side 20 of this housing part projects above the column 3 and the laser element 4. The rigid connection between the sheath 14 and the base 1 may consist, for example, of a resistance welding connection. In this embodiment, the base and the annular sheath constitute the holder for the semiconductor laser diode.

The intermediate part in this embodiment consists of a sleeve 21, which is arranged by its lower side on the upper surface 20 of the sheath 14. The sleeve 21 has a cylindrical inner wall 22 having such a diameter that a tubular holder 16 for an optical transmission fibre 15 slidingly fits into it with its outer wall 17. In the embodiment shown, the sleeve 21 has on one side an annular connection part 23 of reduced thickness and on the other side a thin flange 24. Both the annular connection part and the flange have a thickness of less than 0.4 mm; the thickness is preferably about 0.2 mm.

A transmission fibre 15 to be optically coupled to the laser element 4 is accommodated at its end to be coupled in a tubular holder 16, which has a cylindrical outer wall 17. The end 18 of the transmission fibre is freed from its protecting sheath. By means of a curing glue 19, the core of the fibre is secured to the holder 16; its end to be coupled to a laser diode slightly projects above the holder 16.

The optical coupling of the laser diode 4 to the glass fibre 15 is effected via the sleeve 21 and the tubular holder 16. The holder 16 with the end of the glass fibre secured thereto is slipped into the sleeve 21 and the thin flange 24 of the sleeve is arranged on the upper surface 20 of the annular sheath 14, which forms part of the holder for the laser diode. By means of a computer control (not shown), the end of the core 18 of the optical fibre is now adjusted with respect to the operating laser diode 4. The front end of the fibre core 18 can be displaced both in the direction of height and in lateral direction; the adjustment is continued until the optimum optical coupling is obtained. During the adjustment, the desired position is obtained by displacement of the holder 16 in the sleeve 21 and by lateral displacement of the sleeve 21 on the upper surface 20 of the sheath 14. In the position of optimum coupling, the holder 16 is fixed with respect to end 23 of reduced thickness of the sleeve 21 by means of a few laser welds, preferably three such welds, and the fibre is accurately adjusted in the direction of height with respect to the laser diode.

The heat developed by the laser welds is small, but may nevertheless give rise to a certain lateral displacement of the end 18 of the fibre core. The adjustment must be very accurate in order to obtain an optimum coupling efficiency. Therefore, after the length of tubing 16 has been fixed to the sleeve 21, the adjustment of the fibre end with respect to the laser element is repeated transverse to the longitudinal direction of the fibre by displacing the sleeve 21 on the upper surface 20 of the sheath 14. With this fine adjustment, the ultimate optimum coupling is attained. In this position, the sleeve 21 is fixed with respect to the sheath 14 by securing the thin flange 24 to the upper surface 20 by means of a few laser welds. These welds, for example three, are located at such a distance from the glass fibre that displacement of the fibre core 18 due to a certain thermal effect does not occur.

In the manner described, the transmission fibre is adjusted very accurately with respect to the laser diode. The coupling efficiency is then maximal.

It is mostly desirable that the envelope is sealed in a vacuum-tight manner. The accurately adjusted and fixed coupling must then of course not be lost. In order to obtain a very effective vacuum-tight seal, for example a low melting-point solder is used. For example, an indium-tin solder having a melting point of about 120° C. is provided at the gap between the upper surface 20 of the sheath 14 and the flange 24, this solder filling the gap by capillary effect. The temperature is then sufficiently low to prevent the adjusted coupling from being varied. This solder may also be used in the gap between the holder 16 and the sleeve 21 to obtain a vacuum-tight seal at a temperature which is sufficiently low to maintain the adjusted coupling. The vacuum-tight seal may also be obtained in a different manner, for example by a laser weld around the end of the connection part 23 of reduced thickness and around the end of the thin flange 24.

In order to accommodate the arrangement in a rigid housing and to also guarantee a satisfactory cooling, an outer housing may be used, for example an outer housing 25 as shown in the drawing.

Figure 3:
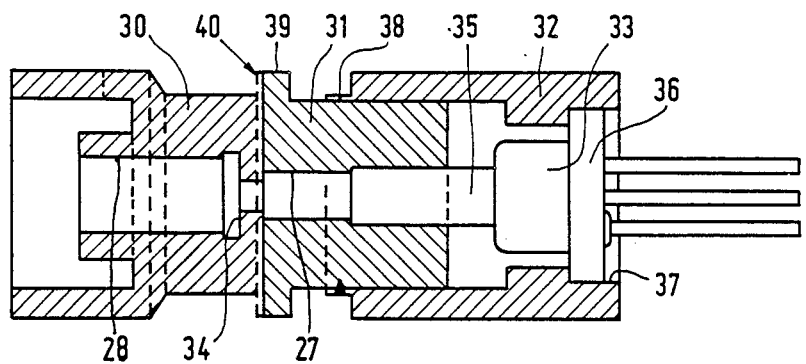
FIG. 3 shows a second embodiment of an optoelectronic arrangement according to the invention.

FIG. 3 shows diagrammatically a particularly favourable further embodiment. The three mutually adjustable parts in this embodiment are an adapter 30, a lens holder 31 and a holder 32 of a laser device 33. The transmission fibre is accommodated in a standard connector (not shown). This standard connector can be coupled to and decoupled from the adpater; in this embodiment, the transmission fibre need therefore not be fixedly provided in the arrangement. If the connector is coupled to the adapter, the end of the transmission fibre accurately engages the surface 34 in the adapter 30.

In a favourable variation thereof, the tubular hole 28 in the adapter 30 extends as far as the surface adjoining the lens holder 31. When the connector is coupled to the adapter, the end of the transmission fibre accurately engages the outer surface of the lens holder 31 adjoining the adapter 30. The latter surface then constitutes an abutment stop because the diameter of the tubular hole 27 in the lens holder 31 is smaller than the diameter of the tubular hole 28 in the adapter 30.

The three main parts 30, 31 and 32 are made of metal, preferably of a steel. The adapter 30 serves, as stated, to accommodate a standard connector with a transmission fibre. The lens holder 31 constructed in this embodiment as an intermediate part comprises a lens 35, for example a known graded index lens. The lens may be fixed in the holder by means of a drop of glue. The holder 32 is hollow. On one side, a foot 36 of the laser 33 is secured in an opening 37 with a tight fit and is locked against displacement, as the case may be by means of a srop of glue. The semiconductor laser diode is located in the envelope 33; the side of the envelope 33 facing the lens 35 is provided with a transparent window. In this embodiment, an envelope sealed in a vacuum-tight manner is used for the laser diode so that no attenuation need be paid to further sealing. The holder 32 is provided on the side remote from the envelope 33 with an annular connection part 38 of a reduced thickness less than 0.4 mm, preferably a thickness of about 0.2 mm.

The intermediate part 31 slidingly fitting into the laser holder 32 is axially displaceable before the ultimate fixation so that the lens 35 and also the end of the optical transmission fibre can be adjusted axially with respect to the semiconductor laser diode. The lens holder 31 has on the side facing the adapter 30 a thick flange 39. The adapter is provided at its surface engaging the lens holder with a thin flange 40, which is thinner than 0.4 mm and preferably has a thickness of about 0.2 mm. Also in this embodiment, the one-time adjustment of the end of the optical transmission fibre with respect to the semiconductor laser diode is effected by mutual axial and transversal movement of the three main parts of the arrangement. If the coupling is optimal, the connection part 38 of reduced thickness is secured to the lens holder by means of a few laser welds, preferably three such welds regularly distributed along the circumference, an ultimate axial adjustment then being obtained. The transversal adjustment can now be verified and the flange 40 of the adapter is then connected by laser welds, preferably three such welds, to the lens holder, a permanent adjustment being obtained, which guarantees an optimum coupling effect.

The thin flange and the connection part of reduced thickness permit of obtaining laser weld connections, which require only a small supply of energy. Both in thermal and in mechanical respect, the connections will not exert a disturbing effect on the optimum adjustment, while the strength is such that even after a longer operating time the adjustment does not vary.

The embodiments described provide two possible applications of the inventive idea. It will be appreciated that the invention may also be realized in a different manner.

I claim:

1. An arrangement for coupling an optical transmission fiber with a laser diode comprising:
    a holder for said optical fiber;
    a holder for said laser diode;
    an intermediate part disposed between said holder for said optical fiber and said holder for said laser diode, one of said two holders and said intermediate part being insertable within one another and having an annular connection part of reduced thickness to permit axial adjustment of one of two said holders and said intermediate part and fixation of same by welding, the other of said holders and said intermediate part having confronting flat surfaces extending traversely to the longitudinal axis of said holder and said intermediate part, one of said confronting surfaces having a flange of reduced thickness to permit welded fixation of said other holder and said intermediate part after transverse adjustment thereof to permit axial and transverse alignment of said optical fiber and said laser diode.

2. The arrangement as claimed in claim 1 wherein the holder for the optical transmission fiber is tubular in configuration and said intermediate part includes a sleeve for receiving said tubular holder, said sleeve forming the part of reduced thickness for attachment to said fiber optical holder, and said sleeve including at its other end a flange extending at right angles to its longitudinal axis for engagement with and attachment to a flat surface on said other holder.

3. The arrangement as claimed in claim 1 wherein said intermediate part includes means for holding at least one lens for focussing the light emitted by said laser diode.

4. The arrangement as claimed in claim 1 wherein at least one of the annular connection part of reduced thickness and the thin flange of reduced thickness has a thickness of less than 0.4 mm.

* * * * *